United States Patent

Hamamoto

(10) Patent No.: US 7,395,183 B2
(45) Date of Patent: Jul. 1, 2008

(54) WEIGHT MEASURING DEVICE

(75) Inventor: Hiroshi Hamamoto, Kyoto (JP)

(73) Assignee: Shimadzu Corporation, Kyoto-shi (JP)

( * ) Notice: Subject to any disclaimer, the term of this patent is extended or adjusted under 35 U.S.C. 154(b) by 282 days.

(21) Appl. No.: 11/115,018

(22) Filed: Apr. 26, 2005

(65) Prior Publication Data

US 2006/0058975 A1 Mar. 16, 2006

(30) Foreign Application Priority Data

Sep. 14, 2004 (JP) ............................. 2004-266579

(51) Int. Cl.
*G01G 19/00* (2006.01)
*G01G 11/00* (2006.01)
(52) U.S. Cl. ..................................... 702/173; 177/25.19
(58) Field of Classification Search ......... 702/128–129, 702/173–174, 189, 199; 177/25.12, 25.13, 177/25.14, 63–64, 185, 25.19; 700/305
See application file for complete search history.

(56) References Cited

U.S. PATENT DOCUMENTS 5,635,679 A * 6/1997 Kohashi et al. .......... 177/25.13

| 6,363,331 | B1 * | 3/2002 | Kyrtsos ...................... 702/175 |
| 6,529,810 | B2 * | 3/2003 | Foo et al. ...................... 701/45 |
| 7,089,528 | B2 * | 8/2006 | Pellegrini et al. ............. 716/19 |

FOREIGN PATENT DOCUMENTS

| JP | 10-19642 | 1/1998 |
| JP | 11-311566 | 11/1999 |

* cited by examiner

*Primary Examiner*—Hal D Wachsman
*Assistant Examiner*—Mary C Baran
(74) *Attorney, Agent, or Firm*—Rankin, Hill & Clark LLP

(57) ABSTRACT

A weight measuring device comprises a load detecting section for constantly detecting a load value (W) of a sample placed on a measuring pan; a moving average processing section for calculating a moving average (Wa) of the detected load value (W); a load changing rate calculating section for calculating a load changing rate per unit time (Wb) of the detected load value (W); a storage section for storing a first load change threshold (Wr1), a second load change threshold (Wr2) which is smaller than the first load change threshold (Wr1) and a load changing rate threshold per unit time (Wt); a determining section for determining whether a moving average processing should be executed; and a weight conversion processing section for calculating a weight of the sample from the load (W) or the moving average (Wa).

4 Claims, 3 Drawing Sheets

WEIGHT MEASURING DEVICE

This application claims foreign priority based on Japanese Patent application No. 2004-266579, filed Sep. 14, 2004, the content of which is incorporated herein by reference in its entirety.

BACKGROUND OF THE INVENTION

1. Field of the Invention

This invention relates to a weight measuring device, such as an electronic balance or an electronic scale, and more particularly to an electronic balance or an electronic scale capable of constantly measuring and displaying a weight value of a sample placed on a measuring pan, thereby allowing a user to add additional amounts of the sample little by little to the measuring pan until a desired weight value is displayed.

Incidentally, the electronic balance or electronic scale referred to herein includes a general weight measuring device for measuring a sample by detecting the weight or load of the sample as an electric signal. For example, it includes an electronic balance provided with an electromagnetic balancing mechanism, and an electronic scale using a load cell, tuning fork, electrostatic capacity and the like.

2. Description of the Related Art

When a sample is placed on a measuring pan of an electronic balance or electronic scale (hereinafter representatively referred to as an electronic balance), the measuring pan oscillates. A measured value displayed on an indicator can be read after the oscillation of the measuring pan gradually attenuates and the measuring pan becomes stable.

In reading the displayed value of the electronic balance, if the measuring pan continues to oscillate under the influence of the surrounding environment and the like, the measured value displayed on the indicator changes, thus making it difficult to read the measured value. For this reason, in order to stabilize the displayed measured value and to facilitate the reading of the measured value, some electronic balances utilize a moving average processing for stabilizing the indication by averaging the current measured data just obtained and a prescribed number of past measured data obtained during a preceding predetermined period (refer to JP-A-11-311566).

When the moving average processing is adopted in order to stabilize the indication of the measured value, it is true that the stability of the indication is improved, while the follow-up capability and response to a load change are deteriorated. When an abrupt load change occurs with the measuring pan, and if the moving average processing is active, the moving average processing operates to suppress an actual load change as well as an oscillating component that is noise. This retards the response to the load change.

In order to avoid such an inconvenience, in executing the moving average processing, a threshold value of a load change range serving as a criterion is set in advance. Then the determination of switching release and start of the moving average processing is performed on the basis of comparison result between the load change actually occurred and the threshold value of the load change range which is set in advance. That is, when the load applied to the measuring pan is changed, during the period in which a load change range is larger than the preset threshold value generated, the moving average processing is released. Whereas when the load change range becomes smaller than this threshold, the moving average processing is started.

On the other hand, in the electronic balance using a "PID control system" in which displacement detection data of a balance beam is PID-operated for feedback control, a plurality of sets of P, I and D values are previously stored so that these setting parameters can be changed optionally at any time by software. Then the measuring environment in which the balance is placed and how the balance is being used are estimated from the time-series information of the displacement detection data of the balance beam. According to the estimated result, an optimum set of the PID values is selectively set from the sets of the PID values previously stored (refer to JP-A-10-19642).

For example, although the servomechanism for balancing the balance is active, when the time-series change of the data is a monotonous increase, this is a state that sample is gradually added to the measuring pan. Thus, it is estimated that weighing operation is now in progress.

Therefore, in this case, a combination of the PID values regarding the high-speed response more important than the stability is selected so that the PID control suitable for weighing operation is executed. Further, if the time-series change is not the monotonous increase, a standard deviation of the time-series data is calculated, and a combination of the PID values which has a larger I value of the PID values for a larger standard deviation and a larger I value and a smaller P value for a shorter oscillation period is selected to execute the PID control. Further, if the oscillation period is the longest, a combination of the PID values with the larger D value is selected to execute the PID control. As described above, according to the time-series information of the displacement detection data, an optimum combination of the PID values is selected.

As described above, in the electronic balance of the related art which adopts the moving average processing as disclosed in JP-A-11-311566, whether the moving average processing should be released or executed is determined by comparison between a preset fixed load change range threshold and an actual load change range. Therefore, in the weighing operation of measuring a very small quantity of load, the moving average processing is maintained as long as the change occurred by one additional load does not reach the fixed threshold. Thus the response to the change due to the very small quantity of additional load is retarded.

Usually, in the weighing operation, as the load approaches a target measured value, additional load is decreased each time. Therefore, if the threshold value is set at a relatively large value, the moving average processing becomes active in an earlier stage. As a result, addition of a very small quantity of load is repeated many times with a retarded response. This takes a long time for measurement, deteriorates the working efficiency, and also is likely to result in excessive measurement or insufficient measurement.

On the other hand, if the threshold value of the fixed load change range is set at a sufficiently small value, in the weighing operation, the load change does not exceed the threshold value until the additional load in each additional operation becomes relatively small. Thus, the load can be measured with good response, while just with a small oscillation, the moving average processing is easily released, thus making the indication unstable.

Further, like the electronic balance using the PID control system disclosed in JP-A-10-19642, high-speed response and stability of indication can be optimized to some degree according to the surrounding environment by the method of selecting the optimum PID values of the PID control according to a use environment.

In this method, however, sets of suitable PID values need to be prepared according to the use environment by actual measurement and the like. This operation requires knowledge about the PID values and labor and time.

Further, the electronic balance sometimes generates a creeping phenomenon that even after the oscillation becomes calm after the load change, a slow change continues for a while as shown in FIG. 3. The creeping phenomenon is sometimes attributable to, for example, deformation of a "Roverbal" mechanism used in a load detecting section, or deformation of a load cell itself or the attached member (bonding layer and the like) for fixing the load cell in an electronic balance using the load cell system.

In the electronic balance disclosed in JP-A-10-19642, when the servomechanism for balancing the balance is active, and if the time-series change of data is a monotonous increase, it is determined that the weighing operation is being executed without exception. Therefore, even if the monotonous increase of the time-series change of data is due to the creeping phenomenon, it is determined that the weighing operation is being executed, thus causing the inappropriate control.

Specifically, since the electronic balance is controlled without distinguishing the cause of data change, in the weighing operation requiring a high-speed response, the stabilization of the indication by moving average processing may be performed. Inversely, in the weighing operation requiring the stabilization, moving average processing may not be performed. Thus, the above electronic balance does not make an appropriate response depending on the situation and the usability is insufficient.

SUMMARY OF THE INVENTION

An object of this invention is to provide a weight measuring device such as an electronic balance or electronic scale which can enhance working efficiency by quickly displaying a weight value of a sample that is being placed or added onto a measuring pan and displaying a stabilized weight value of the sample when additional amounts of the sample are not being added to the measuring pan.

Another object of this invention is to provide an electronic balance or electronic scale with improved usability by appropriately determining whether or not the balance is executing the weighing operation.

In order to solve the above problem, a weight measuring device according to this invention includes a load detecting section for constantly detecting a load value (W) of a sample placed on a measuring pan, a moving average processing section for performing a moving average processing to calculate a moving average (Wa) of the detected load value (W), a load changing rate calculating section for calculating a load changing rate per unit time (Wb) of the detected load value (W), a storage section for storing a first load change threshold (Wr1), a second load change threshold (Wr2) which is smaller than the first load change threshold (Wr1) and a load changing rate threshold per unit time (Wt), a determining section for determining whether moving average processing should be executed on the basis of comparison between the first load change threshold (Wr1) and the detected load value (W), or on the basis of comparison between the second load change threshold (Wr2) and the detected load value (W) and comparison between the load changing rate threshold (Wt) and the calculated load changing rate (Wb), and a weight conversion processing section for calculating a weight of the sample from the load value (W) or the moving average (Wa).

In accordance with this invention, the load detecting section obtains the load of a sample placed on a measuring pan at a predetermined time interval and collects time-series change of the load value (W) (hereinafter, referred to as a load change). The load change of the sample on the measuring pan is compared with the load change threshold which is a criterion for determining whether or not moving average processing should be executed. First, the load change is compared with the first load change threshold (Wr1) which is set as an initial value. When the load change of the sample is larger than the first load change threshold (Wr1), the operation of calculating the moving average is released to acquire the weight converted value on the basis of the load value at this time. This enhances the follow-up capability with the load change to perform the measurement with good response. Thereafter, the same processing is repeated.

When the load change is equal to or smaller than the first load change threshold (Wr1), the load changing rate (Wb) per unit time at this time is compared with the preset load changing rate threshold (Wt). When creeping is occurred, as shown in FIG. 3, the load changing rate per unit time due to the creeping monotonously decreases as time passes and becomes zero eventually. Therefore, as shown in FIG. 4A, the load changing rate due to the creeping does not become larger than the load changing rate (Wt), by setting the load changing rate (Wt) appropriately. On the other hand, during the weighing operation, each time the sample is added to the measuring pan and the additional load is applied, the load changing rate per unit time increases temporarily and exceeds the preset load changing rate threshold (Wt). Thus, in comparison between the load changing rate (Wb) per unit time and the preset load changing rate threshold (Wt), as shown in FIG. 4B, when the load changing rate (Wb) (gradient of the tangential line at each point of the load value data) temporarily exceeds the load changing rate threshold (Wt), it is determined that the load change is caused by the weighing operation. When the load changing rate (Wb) is always smaller than the load changing rate threshold (Wt), it is determined that the weighing operation is not executed or the load change is caused by the creeping phenomenon.

When it is determined that the load change is caused by the weighing operation, the moving average processing is not performed; but in order to enhance the response, the load change threshold is changed from the first load change threshold (Wr1) into the second load change threshold (Wr2) which is smaller than the first load change threshold (Wr1), and the operation of calculating the moving average is released. Subsequently, the weight converted value is acquired on the basis of the load value at the time, thereby performing the measurement with good response. After the load change threshold is changed into the second load change threshold (Wr2), the moving average processing is released even in the weighing operation with a small additional load, thereby performing the measurement with good response.

On the other hand, when the load changing rate (Wb) is smaller than the load changing rate threshold (Wt), and when it is determined that the additional load for weighing operation is not applied or the load change is caused by the creeping phenomenon, the load change threshold is set back to the first load change threshold (Wr1). Then the operation of calculating the moving average is carried out. Further, the weight value is calculated by conversion based on the calculated moving average.

DESCRIPTION OF THE PREFERRED EMBODIMENTS

Figure 1:
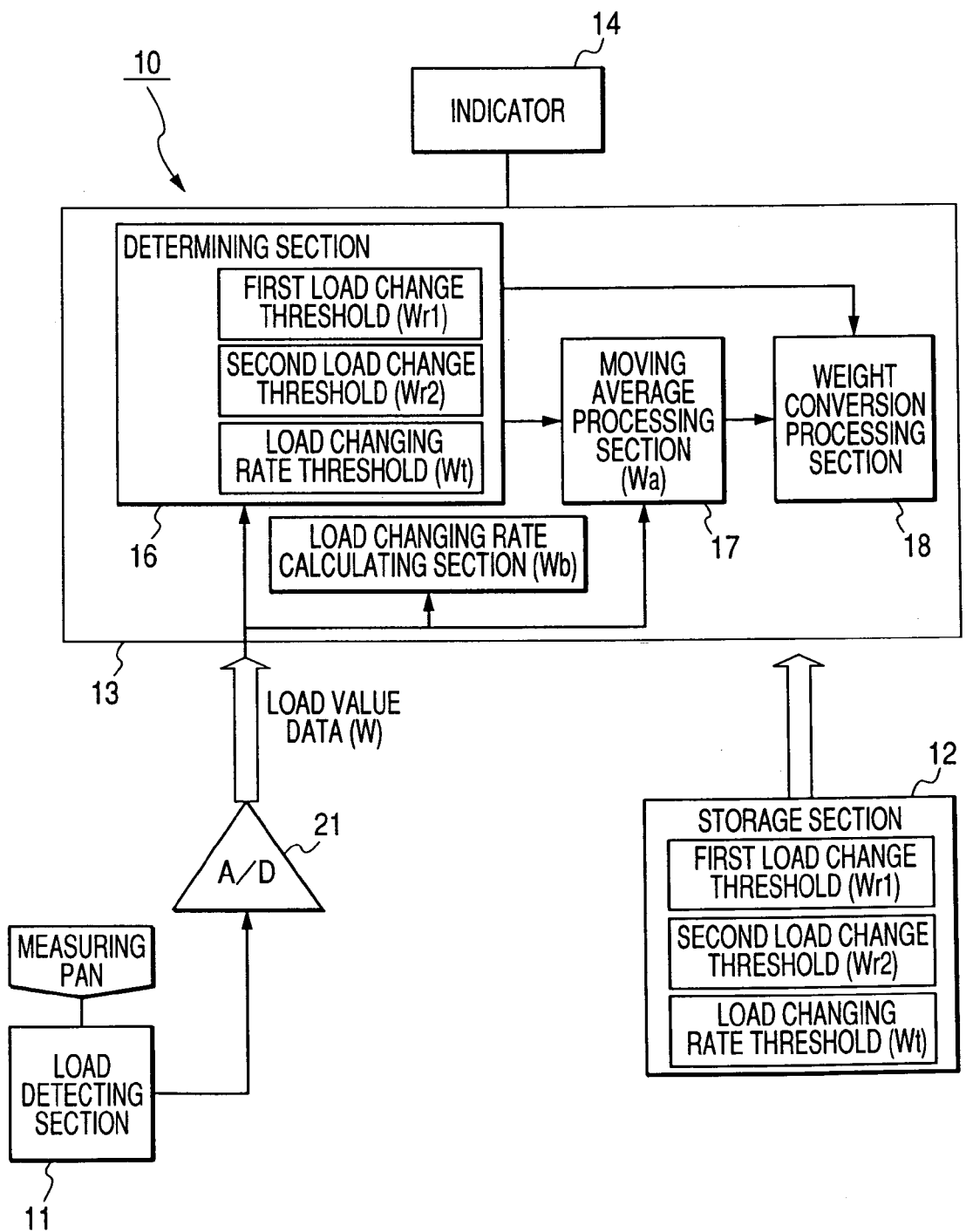
FIG. 1 is a block diagram of an electronic balance according to one embodiment of this invention.

Now referring to the drawings, an embodiment of this invention will be explained. Incidentally, the embodiment described below is an example, and this invention can be modified within a scope not departing from the spirit of this invention.

Figure 2:
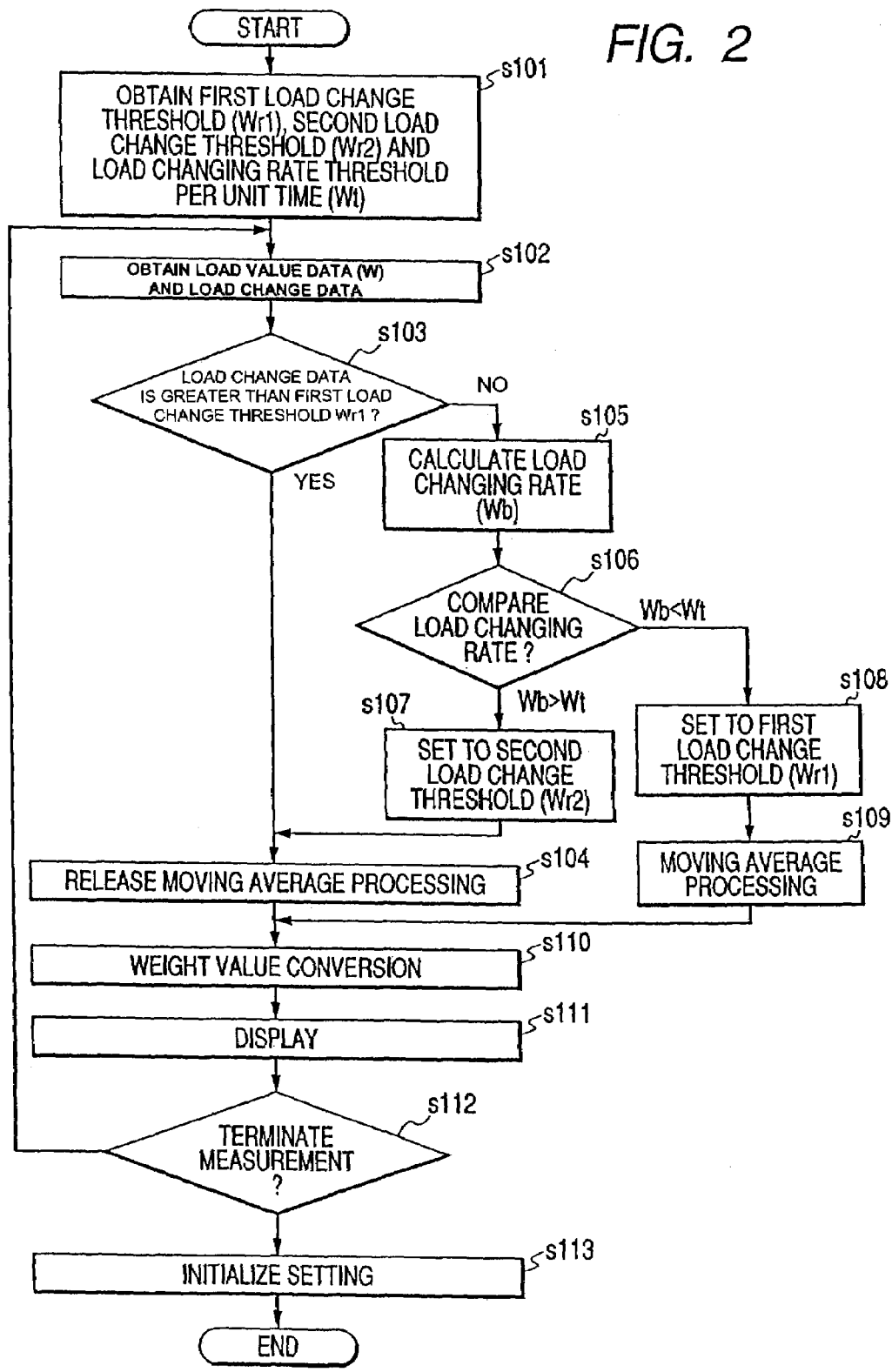
FIG. 2 is a flowchart of load measurement by the electronic balance shown in FIG. 1.
Figure 3:
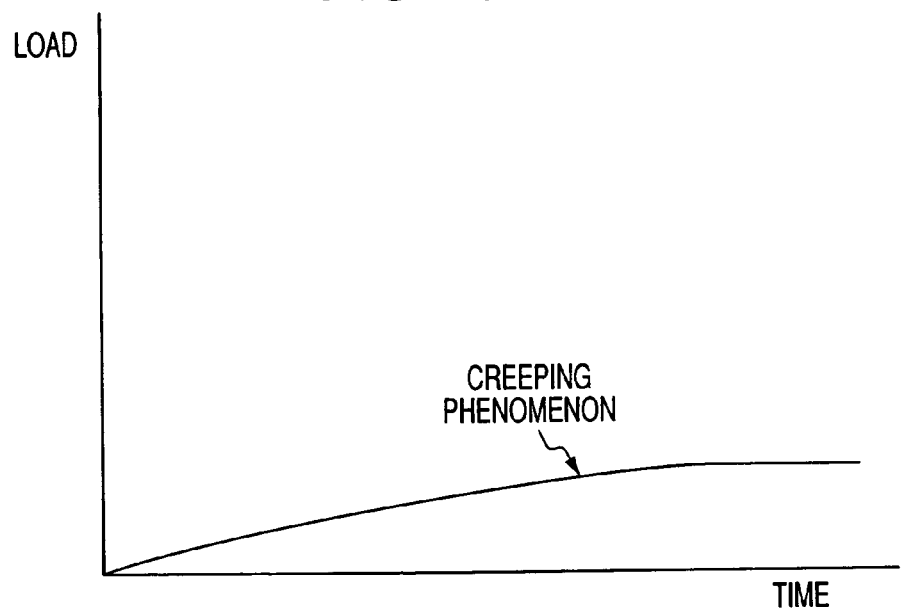
FIG. 3 is a graph showing the creeping phenomenon after stabilization.
Figure 4A:
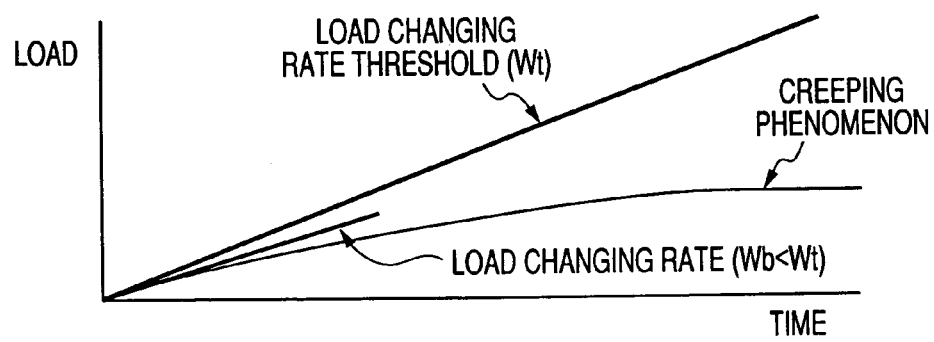
FIGS. 4A and 4B are graphs showing time-series changes of load when a creeping phenomenon is occurred and when the weighing operation is being executed.
Figure 4B:
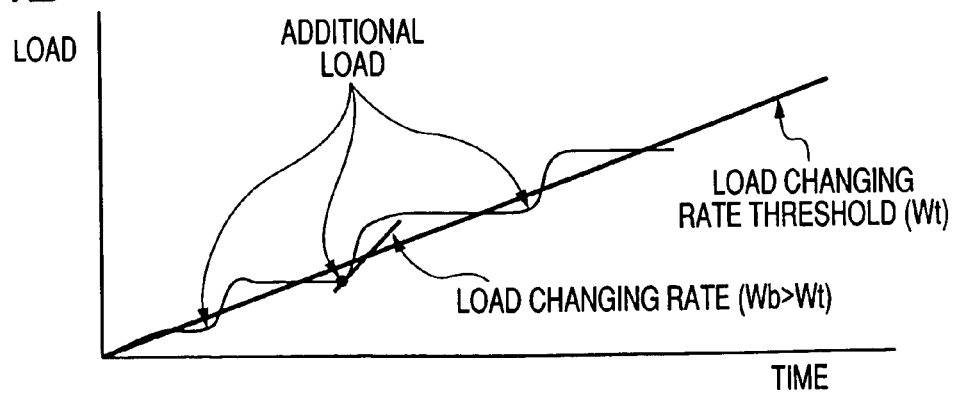

FIG. 1 is a block diagram of an electronic balance according to an embodiment of this invention. FIG. 2 is a flowchart for explaining the operation of the electronic balance shown in FIG. 1. An electronic balance 10 includes a load detecting section 11; a storage section; a control section 13; and an indicator 14. The load detecting section 11 detects the load of a sample placed on a measuring pan at predetermined intervals. The storage section 12 stores threshold parameters used to determine whether or not moving average processing should be executed. The threshold parameters includes a first load change threshold (Wr1), a second load change threshold (Wr2) which is smaller than the first load change threshold (Wr1) and a load changing rate threshold per unit time (Wt), which are used to determine whether or not the moving average processing should be executed. The control section 13 executes the control of the electronic balance and weight measuring operation based on the threshold parameters and the detected load. The indicator 14 displays a measurement result.

The load detecting section 11 may be any detecting device having a mechanism that outputs the load of the sample on the measuring pan as a signal by constantly repeating the measurement on the several milliseconds time scale. For example, the load detecting section 11 may be a balance mechanism and a scale mechanism that are of an electromagnetic balancing type or use a load cell. The load value data (W) which is a signal corresponding to a load value detected in the load detecting section 11 is digitized by an A/D converter 21 and transferred to the control section 13.

The storage section 12 is configured with a memory device such as ROM and RAM. As described above, the storage section 12 stores the first load change threshold (Wr1), the second load change threshold (Wr2) which is smaller than the first load change threshold and the load changing rate threshold per unit time (Wt), which are used to determine whether or not the moving average processing should be executed. When the electronic balance is activated, these parameters are read into the control section 13 as characteristic data and compared with the detected load value data.

The control section 13 is configured with a computer (CPU), and executes various control operations. Among the control operations by the control section 13, explaining the function related to this invention further in detail, the control operations are divided into a determining section 16, a moving average processing section 17 and a weight conversion processing section 18.

The determining section 16 compares the load value data (W) constantly measured at regular time intervals and the load changing rate (Wb) per unit time which is calculated from the load value data (W) using the Equation 1, with the first load change threshold (Wr1), the second load change threshold (Wr2) and the load changing rate threshold (Wt) per unit time, which are read into from the storage section 12, thereby determining whether or not the moving average (Wa) should be calculated.

$$Wb=(W_n-W_{n-1})/t \qquad \text{[Equation 1]}$$

where $W_n$ is n-th load value data and t is a sampling time interval of the load value data. Thus, $(W_n-W_{n-1})$ represents data corresponding to the load change.

The moving average processing section 17 calculates the moving average (Wa) of the load value data (W) in the determination by the determining section 16 whether or not the moving average processing should be performed. That is, the moving average processing section 17 calculates the arithmetic average of the current prescribed number of load value data from the load value data measured in time series to provide the moving average (Wa).

Incidentally, the moving average is given by the Equation 2. Assuming that the current sampling data is n, and the prescribed number is m, $$Wa=(W_{n-m}+W_{n-m+1}+W_{n-m+2}+\ldots+W_n)/m \qquad \text{[Equation 2]}$$

The weight conversion processing section 18 multiplies the load value data (W) from the load detecting section when the moving average processing is not performed, or the calculated moving average (Wa) when the moving average processing is performed, by a span coefficient (sensitivity coefficient), thereby acquiring the weight value of the sample placed on the measuring pan. Incidentally, the span coefficient is previously acquired using a test weight and the like.

The indicator 14 momentarily displays the weight value converted by the weight conversion processing section 18.

Referring to the flowchart of FIG. 2, the measuring operation by the electronic balance 10 will be explained.

(s101)

First, when the electronic balance is activated, the first load change threshold (Wr1), the second load change threshold (Wr2) and the load changing rate threshold per unit time (Wt) are read into from the storage section 12.

(s102)

Next, the load value data (W) detected by the load detecting section 11 and digitized by the A/D converter 21 is read into.

(s103)

Next, the load change data obtained on the basis of the load value data (W) read from the load detecting section 11 is compared with the first load change threshold (Wr1) read from the storage section 12. If the load change data is larger, it is determined that a large load is added. In this case, in order to release the moving average processing, the measuring operation proceeds to s104. On the other hand, if the load change data is smaller or equal to, since there is no large load change, the measuring operation proceeds to s105 in order to determine whether or not the weighing operation is being executed.

(s104)

When the measuring operation proceeded to s104, it is determined that the large load is added or the weighing operation is being executed. Thus, in either case, in order to measure the load change quickly, the moving average processing is released. Then the measuring operation proceeds to s110.

(s105)

In s105, in order to determine whether or not the weighing operation is being executed, the load changing rate per unit time (Wb) is calculated from the load value data (W). Then the measuring operation proceeds to s106.

(s106)

The load changing rate per unit time (Wb) thus calculated is compared with the load changing rate threshold (Wt) read from the storage section 12. The load changing rate threshold (Wt) is set at the value that does not exceed the load changing rate (Wb) when no additional load is applied, even if creeping is occurring. Thus, if the load changing rate (Wb) is larger than the load changing rate threshold (Wt), it is determined that the additional load is due to a weighing operation. Then the measuring operation proceeds to s107. If the load changing rate (Wb) is smaller than the load changing rate threshold (Wt), it is determined that no additional load is being applied and that when the load change rate is not zero, the load change is being caused by the creeping phenomenon. Then the measuring operation proceeds to s108.

(s107)

In s107, since it is determined that the weighing operation is being executed, in order to determine whether or not the weighing operation is being executed even if a small additional load is applied, the threshold for releasing the moving average processing (criterion in s103) is changed from the first load change threshold (Wr1) into the second load change threshold (Wr2). Then the measuring operation proceeds to s104 and the moving average processing is released.

(s108)

In s108, since it is determined that the weighing operation is not being executed, and the threshold for releasing the moving average processing (criterion in s103) is set back from the second load change threshold (Wr2) into the first load change threshold (Wr1). If the threshold for releasing the moving average processing is the first load change threshold (Wr1), it is maintained. In order to execute the moving average processing, the measuring operation proceeds to s109.

(s109)

By executing the moving average processing, the moving average (Wa) is calculated. Then the measuring operation proceeds to s110.

(s110)

The weight value conversion is performed on the basis of the load value data (W) if the moving average processing is released, and on the basis of the moving average (Wa) if the moving average processing is executed. Then the measuring operation proceeds to s111.

(s111)

The data calculated by the weight value conversion is displayed on the indicator 14, and the measuring operation proceeds to s112.

(s112)

If an end button (not shown) is pushed in order to terminate the measurement, the measuring operation proceeds to s113. If the measurement is continued by measuring a next load value data, the measuring operation returns to s102.

(s113)

In the case of terminating the measurement, setting is returned to the initial values (Wr1, Wt), thus ending the measuring operation.

By executing the control operation along the flow as described above, the measuring operation can be executed, determining whether the load change is caused by the weighing operation and the creeping phenomenon when the load change is occurred.

In accordance with the electronic balance according to this invention, it is determined whether or not weighing operation is being executed by using the load change threshold and the load changing rate threshold. Further, during the weighing operation, the moving average processing can be released even with an addition of a small load by using further two large and small load change thresholds. Thus, during the weighing operation, the measurement can be performed with good response, thereby enhancing the usability of the electric balance. During the period other than the weighing operation, the measurement can be performed with good stability by using the moving average.

Further, the time-series change of the load due to the weighing operation can be discriminated from the time-series change of the load due to the creeping phenomenon, thereby enhancing the response only in the weighing operation.

This invention can be applied to fabrication of an electronic balance capable of using high-speed response and indication stability appropriately depending on the situation.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A weight measuring device comprising:
   a load detecting section for detecting a load value (W) of a sample placed on a measuring pan at predetermined time intervals to obtain a load change;
   a moving average processing section for performing a moving average processing to calculate a moving average (Wa) of the detected load value (W);
   a load changing rate calculating section for calculating a load changing rate (Wb) indicating a load change per unit time, based on the obtained load change;
   a storage section for storing a first load change threshold (Wr1), a second load change threshold (Wr2) which is smaller than the first load change threshold (Wr1) and a load changing rate threshold (Wt);
   a determining section for determining to execute the moving average processing when the obtained load change is equal to or smaller than the first load change threshold (Wr1) and when the calculated load changing rate (Wb) is smaller than the load changing rate threshold (Wt); and for changing a threshold for canceling the moving average processing from the first load change threshold (Wr1) into the second load change threshold (Wr2) when the obtained load change is equal to or smaller than the first load change threshold (Wr1) and when the calculated load changing rate (Wb) is larger than the load changing rate threshold (Wt);
   a weight conversion processing section for calculating a weight value of the sample from the load value (W) when the moving average processing is not executed or from the moving average (Wa) when the moving average processing is executed; and,
   an indicator for displaying the weight value.

2. A method for measuring a sample placed on a measuring pan of a weight measuring device, said method comprising:
   detecting a load value (W) of the sample placed on the measuring pan at predetermined time intervals to obtain a load change;
   calculating a load changing rate (Wb) indicating a load change per unit time, based on the obtained load change;

storing a first load change threshold (Wr1), a second load change threshold (Wr2) which is smaller than the first load change threshold (Wr1) and a load changing rate threshold (Wt);

determining to execute moving average processing for calculating a moving average (Wa) of the detected load value (W) when the obtained load change is equal to or smaller than the first load change threshold (Wr1) and when the calculated load changing rate (Wb) is smaller than the load changing rate threshold (Wt);

changing a threshold for canceling the moving average processing from the first load change threshold (Wr1) into the second load change threshold (Wr2) when the obtained load change is equal to or smaller than the first load change threshold (Wr1) and when the calculated load changing rate (Wb) is larger than the load changing rate threshold (Wt);

calculating a weight value of the sample form the load value (W) when the moving average processing is not executed or from the moving average (Wa) when the moving average processing is executed; and, displaying the weight value.

3. The method for measuring a sample placed on a measuring pan of a weight measuring device according to claim 2, further comprising canceling the moving average processing when the obtained load change is larger than the first load change threshold (Wr1).

4. The method for measuring a sample placed on a measuring pan of a weight measuring device according to claim 2, further comprising canceling the moving average processing when the obtained load change is larger than the second load change threshold (Wr2).

* * * * *